US 6,604,548 B2

(12) United States Patent
Geisinger

(10) Patent No.: US 6,604,548 B2
(45) Date of Patent: Aug. 12, 2003

(54) SAFETY VALVE

(75) Inventor: Penrod Geisinger, Humboldt, AZ (US)

(73) Assignee: Vaporless Manufacturing, Inc., Prescott Valley, AZ (US)

( * ) Notice: Subject to any disclaimer, the term of this patent is extended or adjusted under 35 U.S.C. 154(b) by 64 days.

(21) Appl. No.: 09/970,963

(22) Filed: Oct. 4, 2001

(65) Prior Publication Data

US 2002/0189686 A1 Dec. 19, 2002

Related U.S. Application Data

(60) Provisional application No. 60/298,062, filed on Jun. 13, 2001.

(51) Int. Cl.[7] .............................. F16K 17/28; F15D 1/00
(52) U.S. Cl. .................... 138/45; 137/521; 251/121; 239/506
(58) Field of Search ........................... 137/521; 138/45, 138/46; 251/120, 121; 239/505, 506, 570, 590

(56) References Cited

U.S. PATENT DOCUMENTS

| 528,933 | A | | 11/1894 | Fowler | |
|---|---|---|---|---|---|
| 844,923 | A | | 2/1907 | Cridge | |
| 890,550 | A | | 6/1908 | Anderson | |
| 1,105,280 | A | * | 7/1914 | Kurtz | 137/521 |
| 1,726,176 | A | * | 8/1929 | Burke | 138/45 |
| 2,255,324 | A | * | 9/1941 | McGill | 137/521 |
| 2,260,979 | A | | 10/1941 | Morin et al. | 121/46.5 |
| 2,492,873 | A | | 12/1949 | Lams | 226/111 |
| 2,585,509 | A | * | 2/1952 | Smith | 138/45 |
| 3,752,041 | A | | 8/1973 | Smith | 91/416 |
| 3,896,840 | A | | 7/1975 | Andersson | 137/219 |
| 3,965,928 | A | * | 6/1976 | Siegwart | 137/521 |
| 4,030,666 | A | | 6/1977 | Gagliardo | 239/526 |
| 4,117,860 | A | * | 10/1978 | Carlin | 137/521 |
| 4,142,562 | A | | 3/1979 | Murray | 141/206 |

* cited by examiner

Primary Examiner—John Rivell
(74) Attorney, Agent, or Firm—Cahill, Von Hellens & Glazer P.L.C.

(57) ABSTRACT

A safety valve limits but does not curtail flow of fluid from a source through the body of the safety valve upon release of a handle. A pivotable vane disposed within the body is urged to pivot from a first state not restricting fluid flow to a second state restricting fluid flow in response to the force of the fluid flow. A shaft supporting the vane is connected to the handle. Retaining the handle in a position commensurate with the first state of the vane will permit fluid flow through the safety valve, which fluid flow will become limited upon release of the handle due to a change in state of the vane.

20 Claims, 3 Drawing Sheets

SAFETY VALVE

CROSS REFERENCE TO RELATED APPLICATIONS

The present application includes subject matter disclosed in and claims priority to a provisional application entitled "ATTACK LINE SAFETY VALVE" filed Jun. 13, 2001 and assigned Serial No. 60/298,062 describing an invention made by the present inventor.

BACKGROUND OF THE INVENTION

1. Field of the Invention

The present invention relates to safety valves and, more particularly, to safety valves for use with a firehose.

2. Description of Related Art

Firehoses, whether in fluid communication with a pump in a fire truck, a fire hydrant or other source of water under high pressure, emit a high flow rate of water at significant pressure. The reactionary forces present at the nozzle of a firehose are sufficient to require a strong fireman to hold and aim the nozzle. In some situations, two or more firemen are required for safety reasons as well as to aim the emitted stream of water at a location of interest. In the event the firemen lose control of the nozzle due to injury, tripping and falling or other cause, the nozzle will thrash about and becomes a life threatening object to any persons in the vicinity. Additionally, significant damage to adjacent structures, the nozzle and the firehose may occur.

Conventional firehoses include a well known lever operated ball valve to shut off the flow of water. However, if the fireman handling the nozzle loses control due to tripping, injury or other event, it may not be possible to close the ball valve. The resulting loose firehose becomes a danger to life and property.

When a fire gets out of hand and may threaten a fireman, the firehose itself is sometimes used to guide a fireman out of a smoke filled room or out of another location where vision is impaired. If the nozzle is no longer under control and the firehose thrashes about, it can no longer serve as a guide to permit a fireman to escape to safety.

SUMMARY OF THE INVENTION

The present invention is directed to a safety valve for reducing, but not terminating, a high rate of flow under high pressure from the nozzle of a firehose. A manually gripable handle of the safety valve must be manually repositioned to and manually maintained in a fully open state to maintain open the passageway for water flowing through a firehose to the water emitting nozzle. Upon release of the handle due to accident or otherwise, the flow rate through the safety valve is automatically severely curtailed, but not terminated, to preclude occurrence of water hammer and possible damage to ancillary equipment; also the loose firehose nozzle is prevented from thrashing about and potentially causing injury or damage to property. Such reduction of flow rate results from the water flow within the valve acting upon a vane to reposition the vane to automatically restrict further water flow. Thereby, the water flow itself actuates the valve to place it in its nearly closed position and no ancillary power source is required.

The primary object of the present invention is to provide a safety valve for use with conventional firehoses.

Another object of the present invention is to provide a safety valve located intermediate a conventional ball valve and a nozzle of a firehose.

Yet another object of the present invention is to provide a safety valve which nearly closes upon release of a handle.

Still another object of the present invention is to provide a safety valve energized by the flow of fluid upon release of a handle to nearly terminate further fluid flow.

A further object of the present invention is to provide a self energized safety valve for nearly curtailing a flow of fluid upon release of a retaining element.

A yet further object of the present invention is to provide a safety valve that may be retrofitted to existing firehoses.

A still further object of the present invention is to provide a safety valve which will not give rise to water hammer and subsequent damage to pumps and other equipment.

A still further object of the present invention is to provide a method for nearly curtailing the flow of water through the nozzle of a firehose upon release of the discharge end of the firehose.

These and other objects of the present invention will become apparent to those skilled in the art as the description proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Conventional firehoses include a flexible conduit capable of providing therethrough a significant water flow rate at very high pressure in order to eject through a nozzle a stream of water for a significant distance or to a significant height. To achieve such high pressure high flow rate, the hose is usually connected to a high capacity high pressure pump on a fire truck. It might also be connected to a fire hydrant or other source. Water flow through the firehose is essentially controlled by a conventional lever operated ball valve interconnecting the hose with a nozzle. Because of the high pressure high flow rate water discharged from the nozzle, significant effort is required to aim the nozzle and prevent it from thrashing about. Usually a very strong fireman or two or more firemen are required to hold and aim the nozzle.

In the event the fireman or firemen holding the nozzle become injured due to falling debris or for other reasons or trip while they are moving about and holding the nozzle, the nozzle may be inadvertently released. Upon such release, the nozzle will thrash about with significant force and possibly cause injury to any firemen in the vicinity and certainly become damaged by any objects with which it comes it contact. Such damage may also result in bursting of the hose and creation of further attendant problems.

The purpose of the present invention is to provide a safety valve for terminating significant flow of water through the nozzle of a firehose in the event a fireman or firemen lose control of the nozzle. In such event, the resulting discharge of water will be insufficient to cause the nozzle and firehose to thrash about and recovery of the nozzle may be achieved without significant danger to a fireman. Furthermore, in the event the firemen must retreat and such retreat is through a smoke filled room or other condition wherein vision is significantly impaired, the firemen may follow the firehose out of the building without fear of being injured by a hose thrashing about.

Abrupt cessation of water flow creates what is known as water hammer. Water hammer is essentially a pressure wave reflected upstream through a conduit usually created by abrupt termination of water flow. When the pressure wave reaches a pump significant damage may result. Furthermore, various fittings and junctions attendant the conduit may become damaged to the point of creating a hazard. The safety valve described herein does not completely terminate water flow through a firehose and the creation of water hammer is prevented.

While the invention was developed primarily for use with a firehose, it is to be understood that it may be used with great benefit in many other locations wherein flow of fluid is to be automatically almost curtailed upon the occurrence of an unexpected event.

Figure 1:
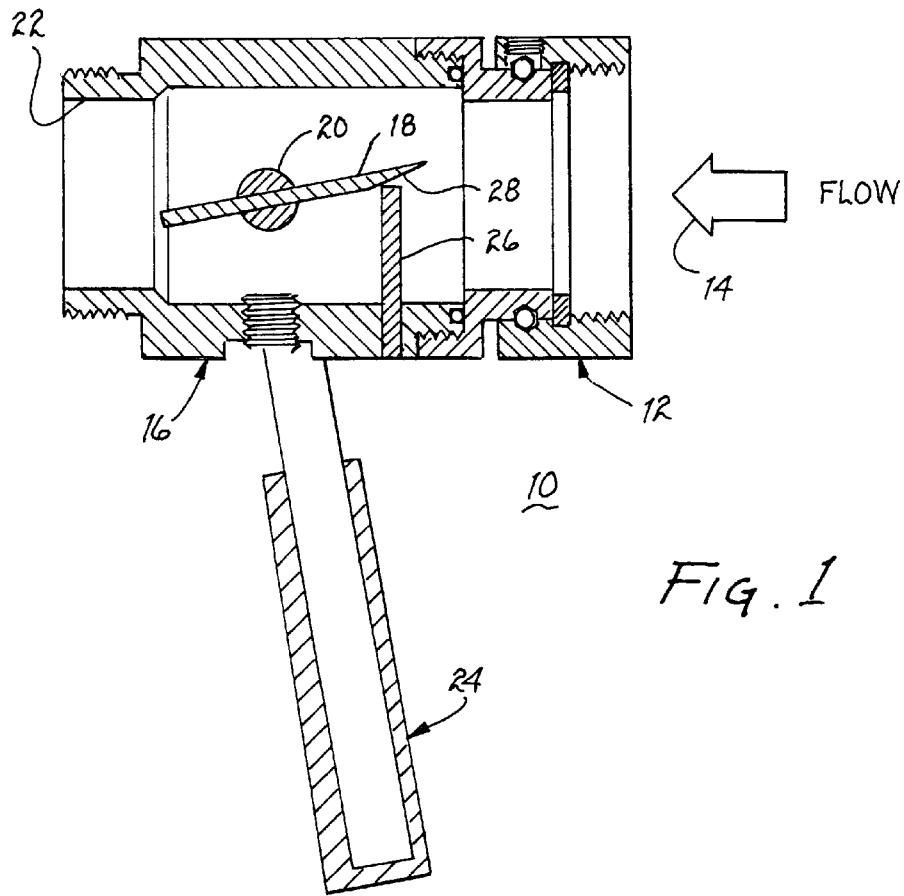
FIG. 1 illustrates a cross-sectional view of the safety valve in the open state.
Figure 2:
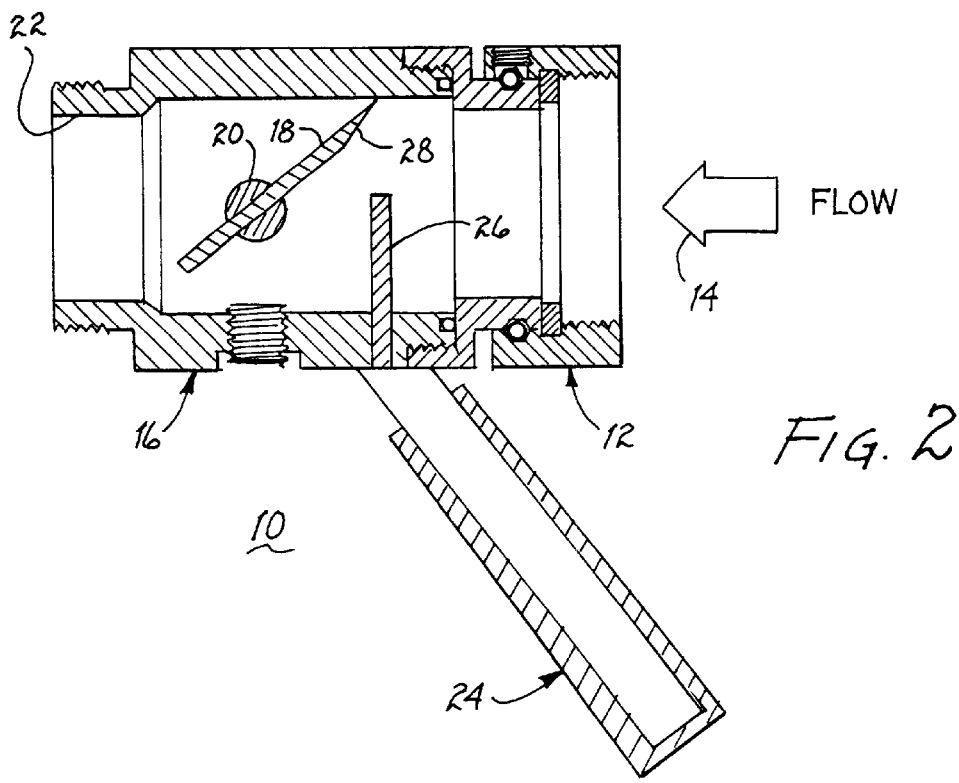
FIG. 2 illustrates a cross-sectional of the safety valve in its closed state.

Referring jointly to FIGS. 1 and 2, the basic structure and operation of safety valve 10 will be described. A swivel coupling 12 is attached to a firehose downstream of a conventional lever operated ball valve presently widely used; in certain embodiments, the swivel coupling may be attached directly to the ball valve. A flow of water enters the swivel coupling, as depicted by arrow 14, and flows through the swivel coupling into a cylindrical body 16. A vane 18 extends through and is attached to a rotatable shaft 20. The flow of water exits the safety valve through outlet 22. A handle 24 is attached to shaft 20 to bring about rotation of the shaft upon arcuate translation of the handle. A support 26 limits clockwise rotation (as shown in the drawings) of vane 18. The vane includes an inclined surface 28 at its upstream end.

In the position shown in FIG. 1, safety valve 10 is in the open state and water will flow through body 16. The water flowing past vane 18 will impinge upon inclined surface 28 to create a force tending to rotate the vane in the counterclockwise rotation. Such rotation is precluded by exerting a force upon handle 24 to resist counterclockwise rotation of the vane. Upon release of the handle, as depicted in FIG. 2, the force acting upon inclined surface 28 will cause vane 18 and attached shaft 20 to rotate in the counterclockwise direction until the upstream end of the vane contacts the interior surface of body 16. It is to be understood that the inclined surface could be replaced by a lip, a baffle or other less elegant impediment to the fluid flow that would be acted upon by the fluid flow to produce a force to rotate the vane. Furthermore, vane 18 could be located relative to shaft 20 to cause the pressure exerted thereon by the fluid flow when the vane is in the opened state (FIG. 1) to be greater on the part of the vane upstream from the shaft than on the part of the vane downstream from the shaft. Such location of the vane will cause the fluid flow to induce the vane to revert to the closed state (FIG. 2).

As depicted in FIG. 2, the downstream end of vane 18 is not in contact with the interior surface of body 16 and water flow therepast will occur. Such water flow is restricted compared to full flow with the resulting flow rate being significantly reduced. Such reduced flow rate has two primary benefits. First, the flow rate through the nozzle attached downstream of body 16 will be reduced to the extent that the nozzle and attached hose will not thrash about. Moreover, the potential injury to any firemen in proximity, damage to the firehose and its components or damage to surrounding structures is essentially eliminated. Secondly, because safety valve 10 does not terminate flow, water hammer will not occur and potential damage to pumps and other equipment upstream will not result due to water hammer.

Should a fireman lose his grip on handle 24 due to a fall, injury or other event, vane 28 will immediately become repositioned from the opened state (first state) shown in FIG. 1 to the closed state (second state) shown in FIG. 2 in response to the fluid flow acting upon vane 18 causing it to become repositioned from the first state to the second state. Thereafter, the conventional ball valve may be closed to prevent further water discharge. Alternatively, the same or another fireman may continue to use the firehose for its intended purpose by translating handle 24 to the position shown in FIG. 1 and resume full water discharge through the nozzle of the firehose.

Figure 3:
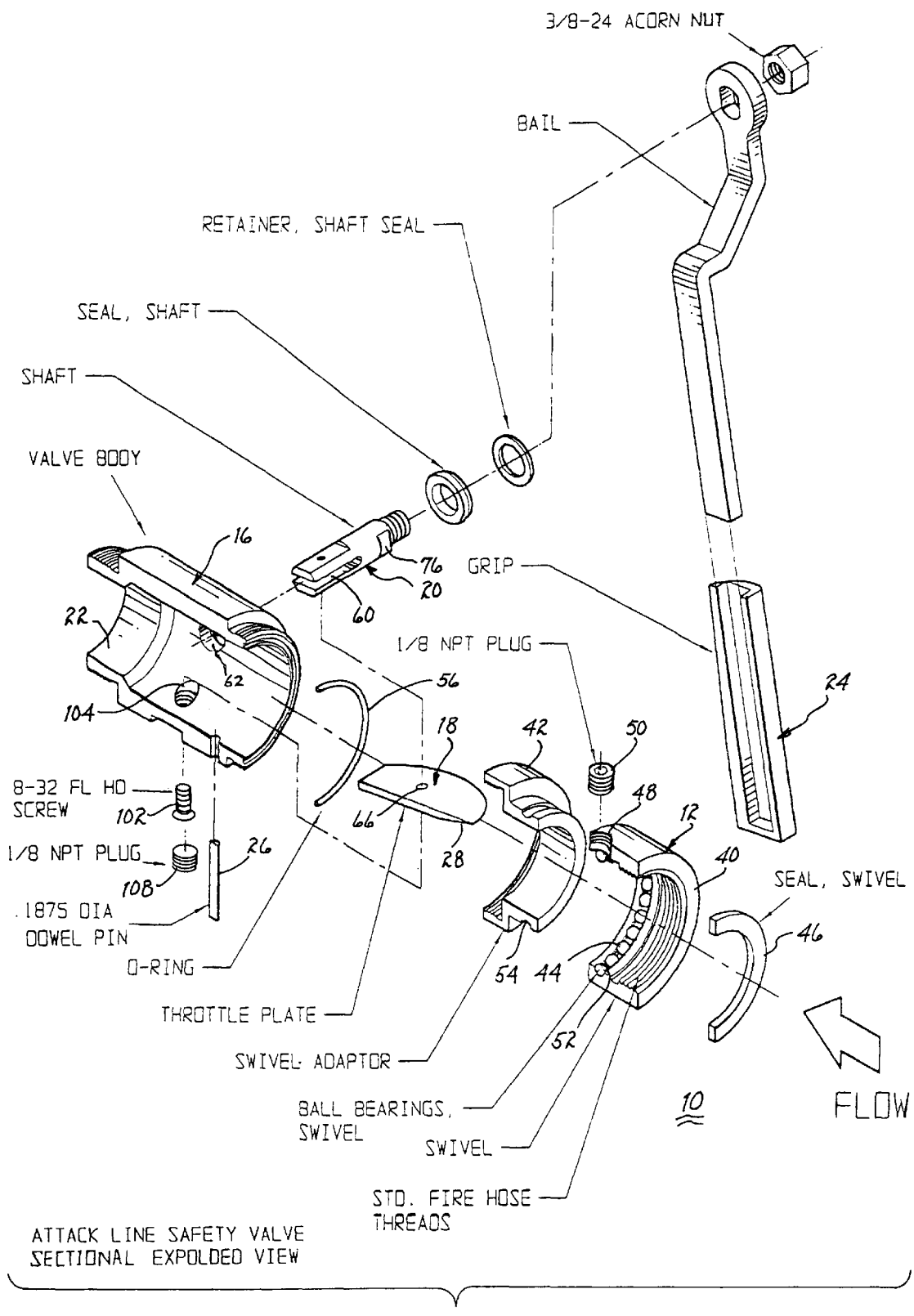
FIG. 3 is a sectional exploded view of the components of the safety valve.
Figure 4:
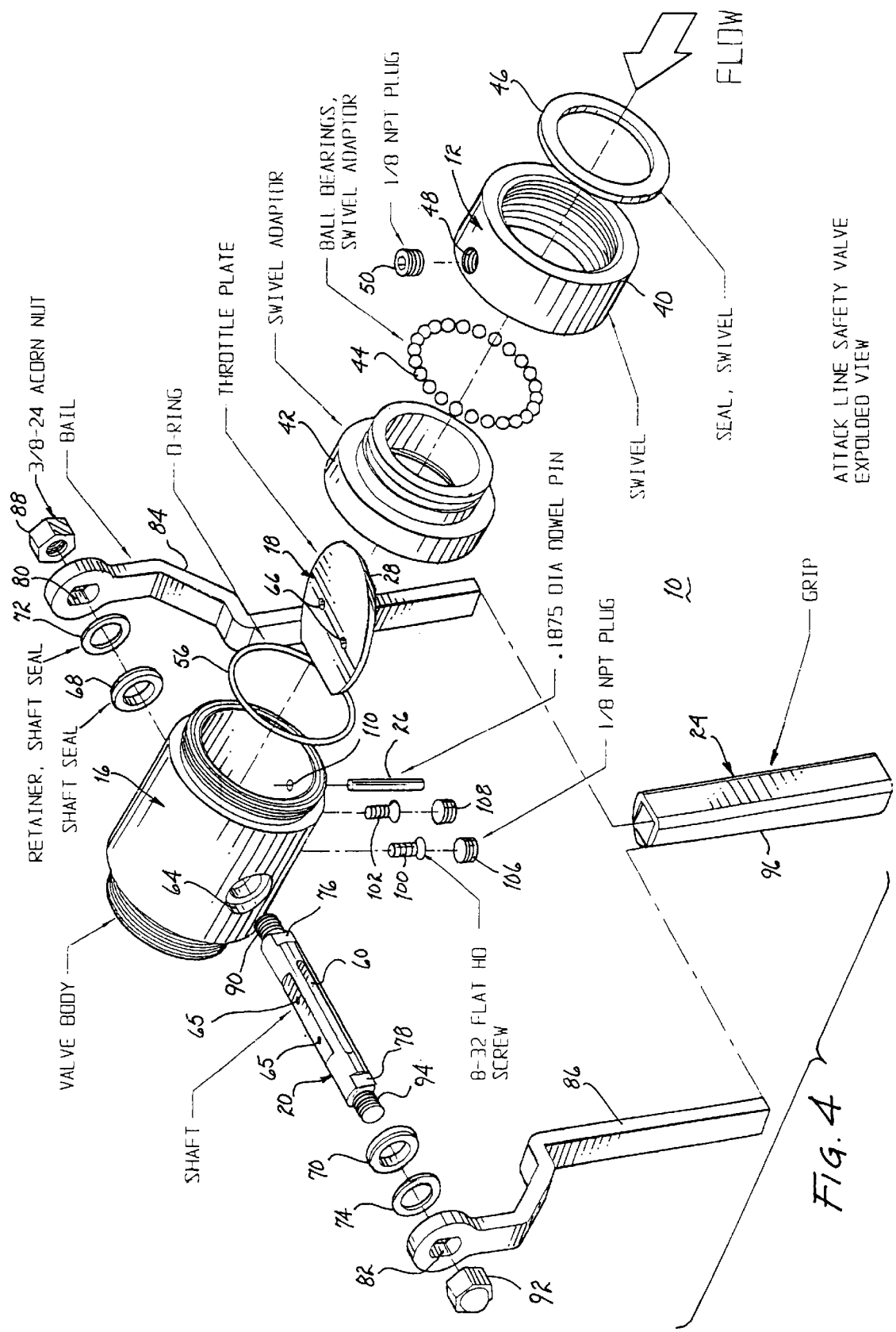
FIG. 4 is an exploded view of the components of the safety valve.

Referring jointly to FIGS. 3 and 4, details of safety valve 10 will be described. Swivel coupling 12 includes a swivel 40 for mating engagement with a swivel adapter 42 and supported by a plurality of ball bearings 44. A seal 46 is interposed intermediate the swivel and the swivel adapter to prevent water leakage therebetween. It is noted that insertion of ball bearings 44 may be effected through aperture 48 closed by a plug 50. The ball bearings engage trough 52 in swivel 40 and annular trough 54 in swivel adapter 42. The swivel adapter is in threaded engagement with body 16 and an O-ring 56 or the like is disposed therebetween to prevent water leakage.

Shaft 20, having a slot 60, is rotatably mounted in circular apertures 62, 64. Vane 18 is inserted through slot 60 and secured in place by threaded bolts or the like extending through apertures 65 in shaft 20 and apertures 66 in vane 18. Seals 68, 70 nest within apertures 62, 64, respectively, in sealing engagement about the shaft. Retainers 72, 74 retain the seals within their respective apertures. Opposed ends of shaft 60 include opposed flats 76, 78 for engagement with correspondingly configured apertures 80, 82 in bails 84, 86. Bail 84 is retained in engagement with flat 76 of the shaft by a nut 88 engaging threaded section 90. Similarly, bail 86 is retained in engagement with flats 78 by a nut 92 in engagement with threaded section 94 of the shaft. A grip 96 receives and extends about the handle sections of bails 84, 86 to collectively constitute handle 24. For assembly purposes, bolt 100 is inserted through an aperture (not shown) in body 16 for penetrable engagement with an aperture 65 in shaft 20 and an aperture 66 in vane 18. It is to be understood that aperture 65 may be threaded to secure bolt 100 in place and retain vane 18 attached to shaft 20. A similar bolt 102 is inserted through aperture 104 in body 16, which aperture corresponds with the aperture through which bolt 100 is inserted. Bolt 102 engages an aperture 65 in shaft 20 and an aperture 66 in vane 18 and may be in threaded engagement with aperture 65 to secure the vane in place. Plugs 106, 108 are for the purpose of sealing the apertures necessary to insert bolts 100, 102. Support 26 may be pressed fit through aperture 110 in body 16. Alternatively, the support may be secured by any other well known means.

By inspection, it will be self evident that the components of safety valve 10 are relatively straight forward. As the purpose of the safety valve is not that of completely shutting off flow of water therethrough, high tolerance machining of the valving elements is not necessary and a highly skilled machinist to create the parts is not required. The construction of the safety valve is relatively simple and highly skilled assemblers to assemble the safety valve are not required. Thus, the costs of labor to make and assemble the safety valve is relatively low. Since many off the shelf parts are used and the components that may have to be manufactured and the labor for assembly are all relatively low cost, safety valve 10 is relatively inexpensive.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

I claim:

1. A safety valve for reducing fluid flow therethrough, said safety valve comprising in combination:
   a) a body;
   b) an inlet for introducing fluid flow into said body;
   c) an outlet for discharging fluid flow from said body;
   d) a pivotable vane disposed in said body, said vane being positionable in a first state to accommodate fluid flow through said body and in a second state for limiting but not curtailing fluid flow through said body, said vane including means for urging said vane from the first state to the second state in response to fluid flow through said body; and
   e) a handle disposed outside of said body for repositioning said vane between said first and second states.

2. A safety valve as set forth in claim 1 wherein said urging means is an inclined surface of said vane.

3. A safety valve as set forth in claim 1 including a support for establishing the position of said vane in the first state.

4. A safety valve as set forth in claim 3 wherein said urging means is an inclined surface of said vane.

5. A safety valve as set forth in claim 1 wherein said vane is supported by a rotatable shaft.

6. A safety valve as set forth in claim 5 wherein said handle is secured to said shaft.

7. A safety valve as set forth in claim 6 wherein said urging means is an inclined surface of said vane.

8. A safety valve as set forth in claim 5 wherein said shaft includes a slot for penetrably receiving said vane.

9. A safety valve as set forth in claim 8 including means for securing said vane with said shaft.

10. A safety valve as set forth in claim 8 wherein said vane extends in opposed directions from said shaft.

11. A safety valve as set forth in claim 1 including a swivel coupling disposed at said inlet for attachment to a source of fluid flow.

12. A method for reducing but not curtailing the flow rate of a fluid through a safety valve, said method comprising the steps of:
   a) accommodating fluid flow through a body of the safety valve with a pivotable vane disposed in a first state within the body;
   b) urging the vane to pivot to a second state in response to fluid flow through the body;
   c) retaining the vane in the first state with a handle external of the body during fluid flow through the body; and
   d) rotating the vane to the second state in response to fluid flow through the body and release of the handle to limit but not curtail fluid flow through the body.

13. The method as set forth in claim 12 wherein said step of rotating is induced by an element of the vane interacting with the fluid flow.

14. The method as set forth in claim 12 wherein said step of rotating includes the step of diverting some of the fluid flow about the vane.

15. The method as set forth in claim 12 wherein the vane and the handle are supported by a rotatable shaft and including the step of rotating the handle to pivot the vane to the first state and to maintain the vane in the first state during fluid flow through the body.

16. A safety valve for limiting but not curtailing flow of fluid through a body of the said safety valve, said safety valve comprising in combination:
   a) a pivotable vane disposed within said body, said vane having a first state for accommodating fluid flow through said body and a second state for limiting but not curtailing fluid flow through said body;
   b) said vane including means responsive to fluid flow through said body for urging said vane to the second state; and
   c) a pivotable handle disposed external of said body for maintaining said vane in the first state during fluid flow through said body when said handle is retained in a first position, said handle being pivoted to a second position upon lack of retention in the first position in response to pivotal movement of said vane urged by the fluid flow through said body.

17. A safety valve as set forth in claim 16 including a rotatable shaft for supporting said vane within said body and said handle external of said body.

18. A safety valve as set forth in claim 16 including a support for supporting said vane in the first state.

19. A safety valve as set forth in claim 16 wherein the second state of said vane is established by contact between said vane and said body as a result of pivotal movement of said vane.

20. A safety valve as set forth in claim 16 including a swivel coupling for attaching said safety valve to a source of fluid flow.

* * * * *